United States Patent
Wu et al.

(10) Patent No.: US 12,007,270 B2
(45) Date of Patent: Jun. 11, 2024

(54) STATUS DETECTION METHOD AND APPARATUS FOR LOAD CELL

(71) Applicants: Mettler-Toledo (Changzhou) Precision Instruments Co., Ltd, Changzhou (CN); Mettler-Toledo (Changzhou) Measurement Technology Co., Ltd, Changzhou (CN); Mettler-Toledo International Trading (Shanghai) Co., Ltd, Shanghai (CN)

(72) Inventors: JianWei Wu, Changzhou (CN); Jianqiang Yang, Changzhou (CN); Liugang Bi, Changzhou (CN)

(73) Assignees: Mettler-Toledo (Changzhou) Precision Instruments Co., Ltd, Changzhou (CN); Mettler-Toledo (Changzhou) Measurement Technology Co., Ltd, Changzhou (CN); Mettler Toledo International Trading (Shanghai) Co., Ltd, Shanghai (CN)

( * ) Notice: Subject to any disclaimer, the term of this patent is extended or adjusted under 35 U.S.C. 154(b) by 314 days.

(21) Appl. No.: 17/448,759

(22) Filed: Sep. 24, 2021

(65) Prior Publication Data
US 2022/0099480 A1 Mar. 31, 2022

(30) Foreign Application Priority Data
Sep. 28, 2020 (CN) .......................... 202011043483.5

(51) Int. Cl.
G01G 23/01 (2006.01)
G01G 23/18 (2006.01)

(52) U.S. Cl.
CPC ............. *G01G 23/01* (2013.01); *G01G 23/18* (2013.01)

(58) Field of Classification Search
CPC ............................. G01G 23/01; G01G 23/18
See application file for complete search history.

(56) References Cited

U.S. PATENT DOCUMENTS 6,801,866 B1 * 10/2004 Yarian .................... G01G 23/01
73/1.13
8,601,575 B2 * 12/2013 Mullarkey .......... H04L 63/1416
709/224

(Continued)

FOREIGN PATENT DOCUMENTS

CN 112577585 A 3/2021

OTHER PUBLICATIONS

Nazari, A. J. et al., Load Cell Fault Detection Using an Rbf Neural Network, 3rd International Conference on Machine Learning and Computing, 2011, pp. V5-538-V5-542.

*Primary Examiner* — Randy W Gibson
(74) *Attorney, Agent, or Firm* — Standley Law Group LLP; Jeffrey S. Standley; Adam J. Smith

(57) ABSTRACT

A method and apparatus are provided for detecting the status of a load cell. When method for detecting the status of a load cell is applied to a multi-point weighing system, the method first collects characteristic sensing data of load cells. It then calculates an anomaly in the characteristic sensing data. From this, it acquires and generates an output signal corresponding to the load cell information when the anomaly exists. The method and apparatus for detecting the status of a load cell can help customers accurately locate a faulty, or potentially faulty, sensor, so as to avoid a measurement error due to sensor problems and improve user satisfaction.

13 Claims, 3 Drawing Sheets

(56) References Cited

U.S. PATENT DOCUMENTS

| 9,587,974 | B2 | | 3/2017 | Wechselberger et al. |
|---|---|---|---|---|
| 10,371,566 | B1 | | 8/2019 | Smith et al. |
| 2002/0066602 | A1 | * | 6/2002 | Bliss ................. G01G 23/3735 177/25.13 |
| 2007/0006652 | A1 | * | 1/2007 | Weldon, Jr. ........ G01G 23/3728 73/579 |
| 2018/0199827 | A1 | * | 7/2018 | Satish ................. A61B 5/7435 |

* cited by examiner

STATUS DETECTION METHOD AND APPARATUS FOR LOAD CELL

CROSS-REFERENCE TO RELATED APPLICATIONS

This application makes a claim of priority to Chinese application 202011043483.5, filed on 28 Sep. 2020, which is incorporated by reference as if fully recited herein.

TECHNICAL FIELD

The present invention relates to weighing and measurement technologies, and in particular to a status detection method and apparatus for a load cell.

BACKGROUND ART

Weighing systems, such as a vehicle scale, a platform scale, and a large material tank scale, generally use multi-point measurement, that is, a scale in the weighing systems is composed of a plurality of load cells. Each load cell transmits weighing data to a terminal, and the terminal displays the weighing data. At the same time, each load cell further transmits its own other characteristic sensing data, such as supply voltage, current, acceleration, temperature, humidity, gas density, angle, etc. to the terminal. The terminal then displays all the sensing data to a user through a terminal interface for the user to observe whether the data is anomalous.

However, for the user, the uploaded sensing data often does not produce actual value. In many cases, the user is not sensitive to the characteristic sensing data, and can hardly find out anomalous data from the data to determine which load cells are in an anomalous state. Although there are some intelligent diagnostic technologies that can provide users with a determination on whether data output by sensors is normal as a whole, it is impossible to specifically determine a certain type of anomalous characteristic sensing data of one or several certain sensors. Therefore, accurate fault location can still not be provided for the users.

SUMMARY OF THE INVENTION

The technical problem to be solved by the present invention is as follows: In view of the problem that a sensor fault cannot be accurately located in the existing sensor detection, a status detection method and apparatus for a load cell are provided, to offer users more direct and meaningful detection and determination, and thereby help customers accurately locate a faulty sensor or a potential faulty sensor, so as to avoid a measurement error due to sensor problems and improve user satisfaction.

To solve the above technical problem, the present invention provides a method for detecting the status of a load cell, which is applied to a multi-point weighing system, the method comprises the steps of: collecting characteristic sensing data of load cells; calculating an anomaly in the characteristic sensing data; and acquiring and outputting corresponding load cell information when the anomaly exists. Preferably, in the status detection method for a load cell, the characteristic sensing data comprises data from at least one of weighing data, acceleration, temperature, gas humidity, angle, gas density, voltage, or current.

Preferably, in the status detection method for a load cell, after said acquiring and outputting corresponding load cell information, the method further comprises the steps of: issuing a reminder of an anomalous load cell state if an anomaly deviation of the anomaly is less than a preset alarm value; and issuing an alarm reminder of load cell replacement if an anomaly deviation of the anomaly is greater than the preset alarm value.

Preferably, in the method, said calculating an anomaly in the characteristic sensing data comprises the steps of: calculating the difference between each piece of characteristic sensing data and a statistical median; and determining, when the difference exceeds a deviation range of an anomaly, that there is an anomaly.

Preferably, in the method, said calculating an anomaly in the characteristic sensing data comprises the steps of: calculating whether each piece of characteristic sensing data obeys sigma distribution, and determining that characteristic sensing data that does not fall within the sigma distribution is an anomaly.

Preferably, in the method, said calculating an anomaly in the characteristic sensing data comprises the steps of: calculating a standard score of each piece of characteristic sensing data, and determining that characteristic sensing data whose deviation exceeds the deviation range is an anomaly.

Preferably, in the method, said calculating an anomaly in the characteristic sensing data comprises the steps of: converting a time domain signal of each piece of characteristic sensing data to a frequency domain through Fast Fourier transform calculation; and determining, through amplitude-frequency characteristic comparison in frequency domain, that characteristic sensing data whose frequency is greater than a preset value is an anomaly.

Preferably, in the method, said calculating an anomaly in the characteristic sensing data comprises the steps of: calculating the mean of the characteristic sensing data except the largest value or the smallest value; calculating the difference between the largest value and the mean of the characteristic sensing data, or the difference between the smallest value and the mean of the characteristic sensing data; determining that the corresponding largest value or smallest value is an anomaly if the difference exceeds an anomaly deviation of an anomaly; and re-calculating the difference between the largest value or the smallest value and the mean in the characteristic sensing data except the anomaly, until there is no anomaly in the characteristic sensing data.

To solve the above technical problem, the present invention further discloses an apparatus for detecting the status of a load cell, which comprises: a collection unit configured to collect characteristic sensing data of load cells; a calculation unit configured to calculate an anomaly in the characteristic sensing data; and a sending unit configured to acquire and output corresponding load cell information when the anomaly exists.

Preferably, in the apparatus, the characteristic sensing data comprises data from at least one of weighing data, acceleration, temperature, gas humidity, angle, gas density, voltage, or current.

Preferably, in the apparatus, the calculation unit is configured to: calculate the difference between each piece of characteristic sensing data and a statistical median; and to determine, when the difference exceeds a deviation range of an anomaly, that there is an anomaly.

Preferably, in the apparatus, the calculation unit is configured to: calculate whether each piece of characteristic sensing data obeys sigma distribution, and to determine that characteristic sensing data that does not fall within the sigma distribution is an anomaly.

Preferably, in the apparatus, the calculation unit is configured to: calculate a standard score of each piece of characteristic sensing data, and to determine that characteristic data whose deviation exceeds the deviation range is an anomaly.

Preferably, in the apparatus, the calculation unit is configured to: convert a time domain signal of each piece of characteristic sensing data to a frequency domain through Fast Fourier transform calculation; and to determine, through amplitude-frequency characteristic comparison in frequency domain, that characteristic sensing data whose frequency is greater than a preset value is an anomaly.

Preferably, in the apparatus, the calculation unit is configured to: calculate the mean of the characteristic sensing data except the largest value or the smallest value; calculate the difference between the largest value and the mean of the characteristic sensing data, or the difference between the smallest value and the mean of the characteristic sensing data; determine that the corresponding largest value or smallest value is an anomaly if the difference exceeds an anomaly deviation of an anomaly; and to re-calculate the difference between the largest value or the smallest value and the mean in the characteristic sensing data except the anomaly, until there is no anomaly in the characteristic sensing data.

The positive improvement effects of the present invention are as follows: Whether a certain piece of characteristic sensing data of one or several certain load cells is anomalous is determined by comparing differences between characteristic sensing data of the load cells in each type of characteristic sensing data in a multi-point application weighing system, so as to find and locate a load cell in an anomalous state in the load cells in a timely manner, offer users more intuitive and valuable operation instructions, and improve user satisfaction.

Some terms representing specific system components are used throughout the specification and claims. As those skilled in the art can understand, different use objects may represent the same component by using different names. Components with different names but the same function are not distinguished herein, and all fall within the protection scope of the present invention.

DETAILED DESCRIPTION OF EMBODIMENTS

To make the above objectives, features, and advantages of the present invention more apparent and easier to understand, embodiments of the present invention will be described in detail below in conjunction with the accompanying drawings.

Embodiment 1

Platform scales are electronic weighing instruments between bench scales and vehicle scales, and they are widely used in industrial production, commodity trading, and daily life. The platform scale may comprise multi-point weighing composed of a plurality of load cells, such as four load cells, which are installed at respective weighing positions of the platform scale.

(1) Zero-Point Weight Differentiation Detection

A weighing platform of a platform scale needs to be levelled before calibration of the platform scale. If the weighing platform is not level, it will severely affect linearity and hysteresis of the weighing platform, resulting in inaccurate weighing. Therefore, if it is detected that outputs of the four sensors are relatively close when there is no load on the weighing platform, it indicates that the weighing platform has been levelled. If a certain sensor has displacement after use of the weighing platform for a period of time, or due to improper operation by a user, and when an output of a certain load cell is significantly larger or smaller than outputs of the other sensors at the zero point, it can be determined that the load cell may be in an anomalous state and needs further troubleshooting.

Figure 1:
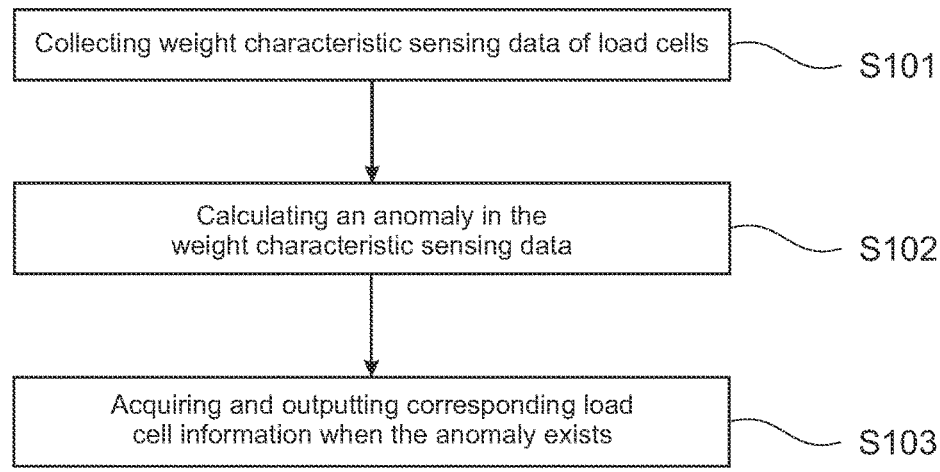
FIG. 1 is a schematic flowchart of a status detection method for a load cell according to a first embodiment of the present invention.

A method for detecting the status of a load cell in this embodiment, which is applied to a platform scale system and comprises, as seen in FIG. 1:

Step S101, collecting weight characteristic sensing data $W_{M_i}$ of load cells.

$M_i$ represents a corresponding load cell, and then there is the weight characteristic sensing data queue ($W_{M_1}$, $W_{M_2}$, $W_{M_3}$, $W_{M_4}$).

Step S102, calculating an anomaly in the weight characteristic sensing data.

Anomalies are particular values in a sample, data of which notably deviates from the remaining observations. Generally, anomalies can also be referred to as outliers, and analysis of anomalies can also be referred to as outlier analysis. In this embodiment, the differences between the acquired weight characteristic sensing data of the load cells are detected by using a median algorithm, so as to calculate the anomaly in the weight characteristic sensing data. The characteristic sensing data is first sorted, and with the medium value $W_M$ as a benchmark, the differences of the weight characteristic sensing data ($W_{M_1}$, $W_{M_2}$, $W_{M_3}$, $W_{M_4}$)–$W_M$ are calculated. It is further determined whether the difference between a piece of characteristic sensing data and the medium value is greater than a preset value. If yes, the piece of characteristic sensing data is determined as an anomaly.

Step S103, acquiring and outputting corresponding load cell information when the anomaly exists.

In the platform scale system, data graphs, such as a box plot, a histogram, and a scatter plot, can be drawn to identify and display anomalies; or a scatter plot with a regression line can be used to show that most points follow the fitted straight line of the model and dots marked in red circles represent data points that deviate from this model.

The system determines the severity of anomaly depending on the degree of anomaly deviation of an anomaly, and issues a reminder or an alarm to a user. If an anomaly deviation of the anomaly is less than a preset alarm value, a reminder of an anomalous load cell state is issued; and if an anomaly deviation of the anomaly is greater than the preset alarm value, an alarm reminder of immediate load cell replacement is issued to the user at the same time when location information of the load cell in an anomalous state is provided.

The information about the load cell, such as its number information or location information, corresponding to the anomaly is acquired and output to a display device such as a meter end or a user mobile end, so as to present, to the user on the meter end, a specific characteristic value of a specific load cell that has a problem. Text may be displayed on the meter, or a location indication of the anomalous load cell may be issued by turning on a light, so that the user can quickly find the load cell that has a problem. Through weight differentiation detection, anomalous weight data can be detected in real time, and users can be offered fault information and reminders in a timely manner, so as to avoid losses to customers due to inaccurate weighing.

(2) Voltage and Current Differentiation Detection

Under normal circumstances, voltages of the four sensors of the platform scale have little difference. However, when a voltage of a certain sensor has a large difference, even in the normal range of variation, it will have a significant impact on the normal operation of the load cells.

Figure 2:
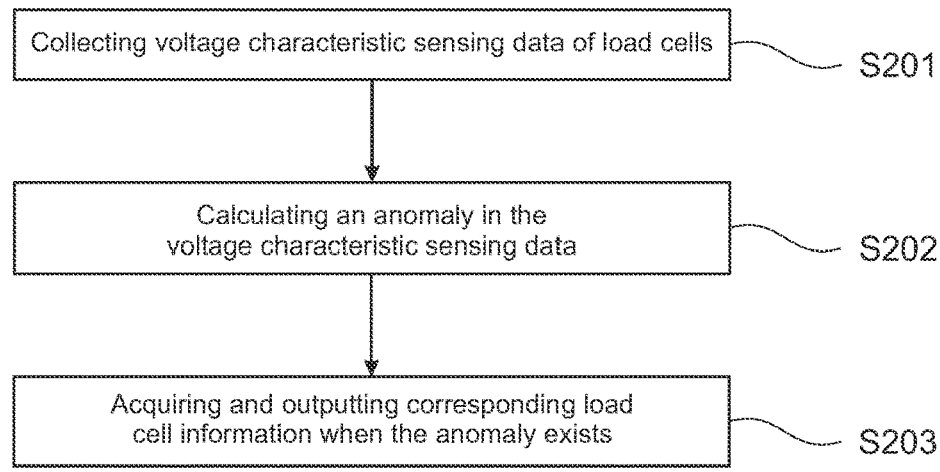
FIG. 2 is a schematic flowchart of another status detection method for a load cell according to the first embodiment of the present invention.

In the bench scale weighing system of this embodiment, the platform scale system involves not only current and voltage detection of the load cells, but also current and voltage differentiation detection of the multi-point sensors. The method comprises, as seen in FIG. 2:

Step S201, collecting voltage characteristic sensing data $S_{M_i}$ of the load cells.

First, the platform scale system collects the voltage characteristic sensing data $S_{M_i}$ of the load cells, and there is the voltage characteristic sensing data queue ($S_{M_1}$, $S_{M_2}$, $S_{M_3}$, $S_{M_4}$).

Step S202, calculating an anomaly in the voltage characteristic sensing data.

The differences between the voltage characteristic sensing data are detected by using the median algorithm, to obtain a possible voltage anomaly and its corresponding load cell in an anomalous state.

Step S203, acquiring and outputting corresponding load cell information when the anomaly exists.

The information about the load cell, such as its number information or location information, corresponding to the anomaly is acquired and output to a display device such as a meter end or a user mobile end, so as to present, to the user on the meter end, a specific characteristic value of a specific load cell that has a problem. Compared with simply displaying voltage data, this is very meaningful to the user in practical operation.

The system determines the severity of anomaly depending on the degree of anomaly deviation of an anomaly, so as to issue either a reminder or an alarm to the user.

The above voltage anomaly detection for the load cells can also be applied to the current anomaly detection for the load cell.

(3) Temperature Differentiation Detection

Figure 3:
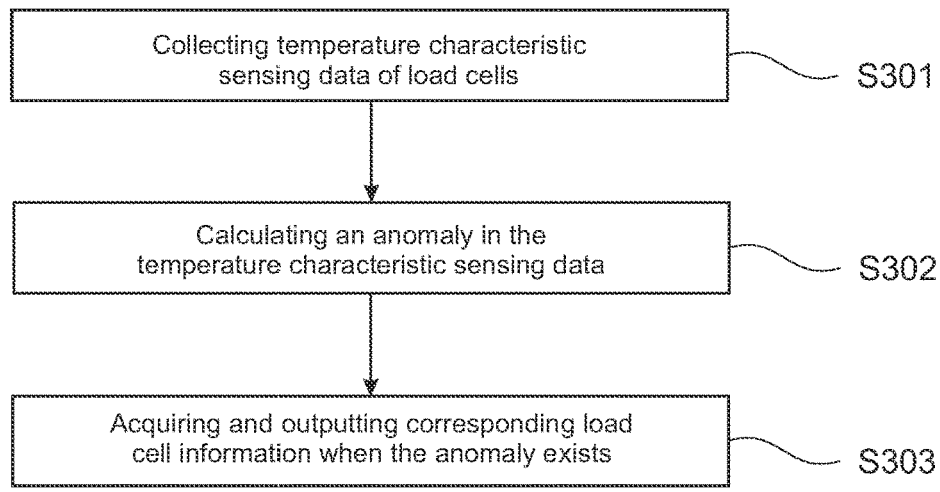
FIG. 3 is a schematic flowchart of still another status detection method for a load cell according to the first embodiment of the present invention.

In temperature detection for a single load cell, when the temperature is lower or higher than a specified value, a fault can be diagnosed and an alarm can be issued. However, even when the temperature is within a normal range, a load cell is considered as an anomaly if its temperature difference from the other sensors is greater than a normal deviation range, for example, the temperature of the other load cells is 25° Celsius, while this load cell is 40° Celsius. The temperature difference will cause a change in sensor performance and eventually a change in performance. In the bench scale weighing system of this embodiment, the platform scale system involves not only temperature detection for a single load cell, but also temperature differentiation detection for the multi-point sensors. The method comprises, as seen in FIG. 3:

Step S301, collecting temperature characteristic sensing data $T_{M_i}$ of the load cells.

The platform scale system collects the temperature characteristic sensing data $T_{M_i}$ of the load cells, and there is the temperature characteristic sensing data queue ($T_{M_1}$, $T_{M_2}$, $T_{M_3}$, $T_{M_4}$).

Step S302, calculating an anomaly in the temperature characteristic sensing data.

The differences between the temperature characteristic sensing data are detected by using the median algorithm, to calculate the differences $(T_{M_1}, T_{M_2}, T_{M_3}, T_{M_4}) - T_M^{T_M}$ between the temperature characteristic sensing data and the medium value $T_M$, so as to obtain a possible anomaly.

Step S303, acquiring and outputting corresponding load cell information when the anomaly exists.

The information about the load cell, such as its number information or location information, corresponding to the anomaly is acquired and output to a display device such as a meter end or a user mobile end, so as to present, to the user on the meter end, a specific characteristic value of a specific load cell that has a problem. Further, the system determines the severity of anomaly depending on the anomaly degree of an anomaly, and issues a reminder or an alarm to the user.

In this embodiment, through the temperature differentiation detection of the load cells, the potential problems can be found in a timely manner, thereby preventing measurement accuracy from being affected.

Embodiment 2

A material tank system is widely used in industrial and agricultural production, and may comprise multi-point weighing composed of a plurality of load cells, such as four load cells.

(1) Zero-Point Weight Data Anomaly Detection

All the sensors have basically consistent zero-point outputs during calibration of the material tank system, to ensure accuracy of measurement. When a material tank has an offset on a weighing foundation, an output of a certain sensor will often be too large or too small, which further affects precision severely. A method for detecting the status of a load cell in this embodiment is applied to a material tank system, wherein the material tank system comprises three load cells.

Figure 4:
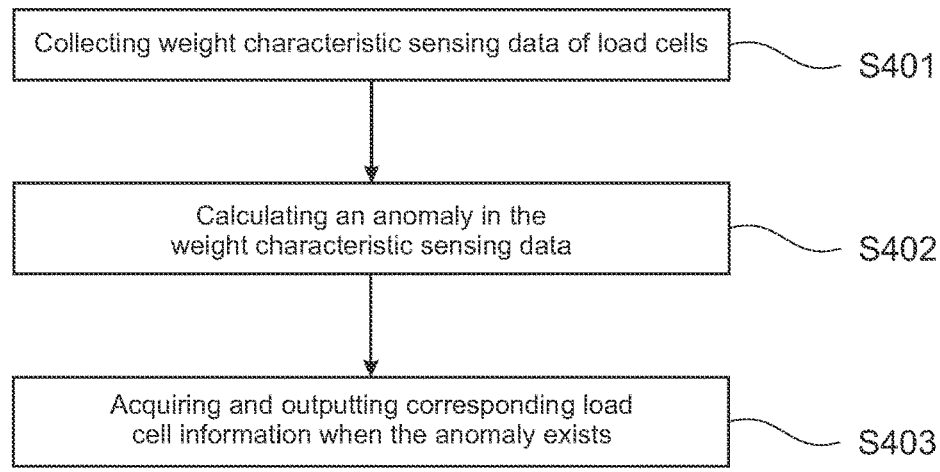
FIG. 4 is a schematic flowchart of still another status detection method for a load cell according to a second embodiment of the present invention.

A method for detecting the status of a load cell in this embodiment is applied to a material tank system and comprises, as seen in FIG. 4:

Step S401, collecting weight characteristic sensing data $W_{M_i}$ of load cells.

$M_1$ represents a corresponding load cell, and then there is the weight characteristic sensing data queue ($W_{M_1}$, $W_{M_2}$, $W_{M_3}$).

Step S402, calculating an anomaly in the weight characteristic sensing data.

In this embodiment, the differences between the weight characteristic sensing data is detected based on sigma distribution, to obtain an anomaly therein. To be specific, the mean Mu and the standard deviation sigma are first calculated, and then [μ±3×σ] is calculated to obtain the 3-sigma interval. Whether the anomaly exists is determined by comparing whether the weight characteristic sensing data ($W_{M_1}$, $W_{M_2}$, $W_{M_3}$) falls within the range of the interval. For the determination interval [μ±3×σ], the coefficient of sigma may be set according to actual needs, for example, may be [μ±σ], [μ±2×σ], or [μ±5×σ].

Step S403, acquiring and outputting corresponding load cell information when the anomaly exists.

If there is characteristic sensing data that does not fall into the interval, it is determined that there is anomalous weight characteristic sensing data. The information about the load cell, such as its number information or location information, corresponding to the anomaly is acquired and output to a display device such as a meter end or a user mobile end, so as to present, to the user on the meter end, a specific characteristic value of a specific load cell that has a problem. The system determines the severity of anomaly depending on the degree of anomaly deviation of an anomaly, and issues a reminder or an alarm to the user. If an anomaly deviation of the anomaly is less than a preset alarm value, a reminder of an anomalous load cell state is issued; and if an anomaly deviation of the anomaly is greater than the preset alarm value, an alarm reminder of load cell replacement is issued at the same time when location information of the load cell in an anomalous state is provided. Through zero-point weight data differentiation detection, users can be offered fault information and reminders in a timely manner, to avoid losses to customers due to inaccurate weighing.

(2) Vibration Anomaly Detection

The material tank system will periodically oscillate during mixing operations. Under normal circumstances, oscillation frequency sensed by a load cell should be consistent with mixing frequency. However, if the detected frequency is excessively high, it can be inferred that the load cell is in an anomalous state and the user needs to check it immediately.

Figure 5:
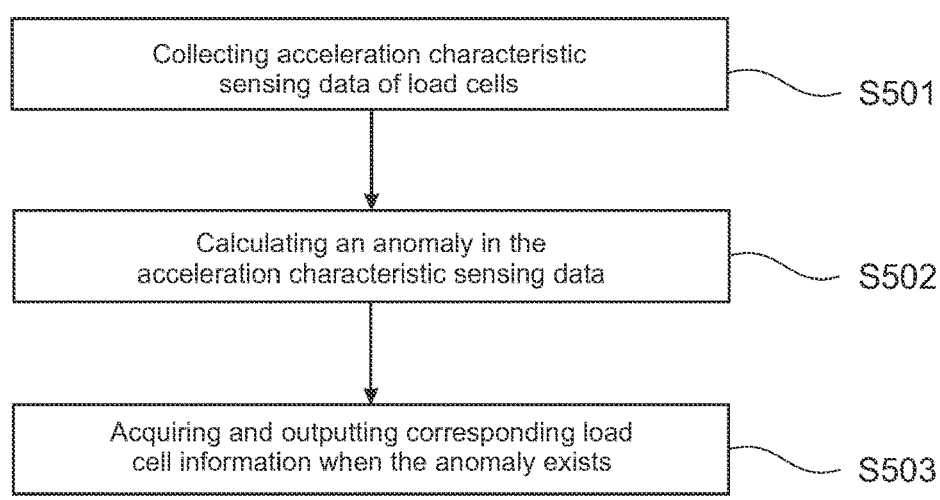
FIG. 5 is a schematic flowchart of another status detection method for a load cell according to the second embodiment of the present invention.

A method for detecting the status of a load cell in this embodiment is applied to a material tank system and comprises, as seen in FIG. 5:

Step S501, collecting acceleration characteristic sensing data $W_{M_i}$ of load cells.

The acceleration characteristic sensing data can be obtained by an angle sensor or an acceleration sensor installed in the corresponding load cell. The system first collects, through the angle sensor or the acceleration sensor, three pieces of acceleration characteristic sensing data ($X_{M_1}$, $X_{M_2}$, . . . , $X_{M_M}$), ($Y_{M_1}$, $Y_{M_2}$, . . . , $Y_{M_M}$), and ($Z_{M_1}$, $Z_{M_2}$, . . . , $Z_{M_M}$) of the load cells, wherein ($X_{M_M}$, $Y_{M_M}$, $Z_{M_M}$) are three outputs of a triaxial accelerometer, representing its acceleration in a rectangular coordinate system. In practical application, when the load cell is disposed vertically, if vibration occurs, the acceleration characteristic sensing data of the load cell in the Z-axis do not change much, but that in the X-axis or Y-axis changes much; or when the load cell is disposed horizontally, if vibration occurs, the acceleration characteristic sensing data in the X-axis and Y-axis do not change much, but that in the Z-axis changes much.

Step S502, calculating an anomaly in the acceleration characteristic sensing data.

In this embodiment, the differences between the acceleration characteristic sensing data is detected by using a Fast Fourier transform algorithm. First, the acceleration characteristic sensing data as a time domain signal is converted, through Fast Fourier transform, to each acceleration sensor frequency domain signal, namely, frequency.

Then, the acceleration characteristic sensing data after each load cell is converted to frequency is sorted by using the median method, and the difference between each piece of acceleration characteristic sensing data and the medium value is separately calculated. It can be determined whether a frequency that is significantly different from the overall situation, namely, an anomaly exists, so as to determine whether the load cell has large vibration that may affect the weighing result. For example, as described above, when the load cell is disposed horizontally, if acceleration characteristic sensing data $Z_{M_M}$ of one load cell in the Z-axis direction is an anomaly, it can be known that the load cell has anomalous vibration. It may be appreciated that, in this embodiment, other anomaly detection methods can also be used to compare amplitude-frequency characteristics in the frequency domain, so as to find an anomaly therein.

Step S503, acquiring and outputting corresponding load cell information when the anomaly exists.

The system determines the severity of anomaly depending on the degree of anomaly deviation of an anomaly, and issues a reminder or an alarm to the user. The information about the load cell, such as its number information or location information, corresponding to the anomaly is acquired and output to a display device such as a meter end or a user mobile end, so as to present, to the user on the meter end, a specific characteristic value of a specific load cell that has a problem. Text may be displayed on the meter, or a location indication of the anomalous load cell may be issued by turning on a light, so that the user can quickly find the load cell that has a problem. The user can analyze possible causes of the anomaly by troubleshooting, for example, a sensor fault, large environmental interference, and large vibration. The anomaly detection through Fourier transform in this embodiment can be applied to scenarios of vibration monitoring with accelerometers or angle sensors.

(3) Humidity Anomaly Detection

The material tank is used in a large mixing plant, with harsh working conditions. Sometimes the sensors are immersed in water for a long time. Many sensors fail due to moisture. The zero point of the sensor will drift after being exposed to moisture, which will eventually make the sensor useless.

Figure 6:
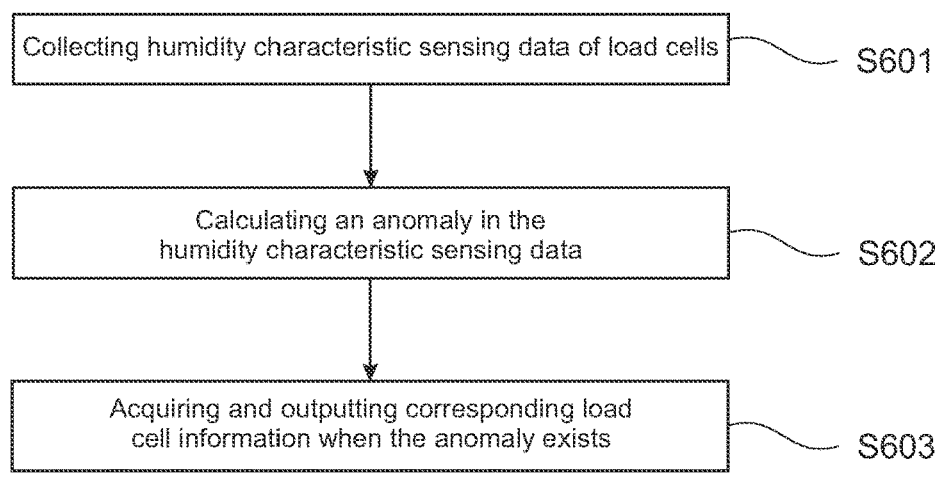
FIG. 6 is a schematic flowchart of still another status detection method for a load cell according to the second embodiment of the present invention.

A method for detecting the status of a load cell in this embodiment is applied to a material tank system and comprises, as seen in FIG. 6:

Step S601, collecting humidity characteristic sensing data $H_{M_i}$ of load cells.

The material tank system first collects the humidity characteristic sensing data $H_{M_i}$ of the load cells by using a disposed humidity sensor, and there is the humidity characteristic sensing data queue ($H_{M_1}$, $H_{M_2}$, $H_{M_3}$).

Step S602, calculating an anomaly in the humidity characteristic sensing data.

In this embodiment, the differences between the humidity characteristic sensing data are detected by using a standard score algorithm. To be specific, Z-scores, namely, standard scores of the humidity characteristic sensing data are calculated through the formula $Z_i = (H_{M_i} - \mu)/\sigma$, wherein $H_{M_i}$ is a specific piece of humidity characteristic sensing data, μ is the mean, and σ is the standard deviation.

Step S603, acquiring and outputting corresponding load cell information when the anomaly exists.

The system determines the severity of anomaly depending on the degree of anomaly deviation of an anomaly, and issues a reminder or an alarm to the user. If an anomaly deviation of the anomaly is less than a preset alarm value, a reminder of an anomalous load cell state is issued; and if an anomaly deviation of the anomaly is greater than the preset alarm value, an alarm reminder of load cell replacement is issued at the same time when location information of the load cell in an anomalous state is provided.

The information about the load cell, such as its number information or location information, corresponding to the anomaly is acquired and output to a display device such as a meter end or a user mobile end, so as to present, to the user on the meter end, a specific characteristic value of a specific load cell that has a problem. Text may be displayed on the meter, or a location indication of the anomalous load cell may be issued by turning on a light, so that the user can quickly find the load cell that has a problem. The alarm reminder is issued, to prevent inaccurate weighing or even uselessness due to the sensors being exposed to moisture.

Embodiment 3

The multi-point weighing technology is also widely used in vehicle scale systems. A vehicle scale system of this embodiment is composed of eight load cells.

In vehicle scale applications, each load cell is equipped with a gas sensor for air density detection. Through comparison of the differences between gas concentration of the sensors, it can be determined that air density of one or several certain sensors have a problem.

Figure 7:
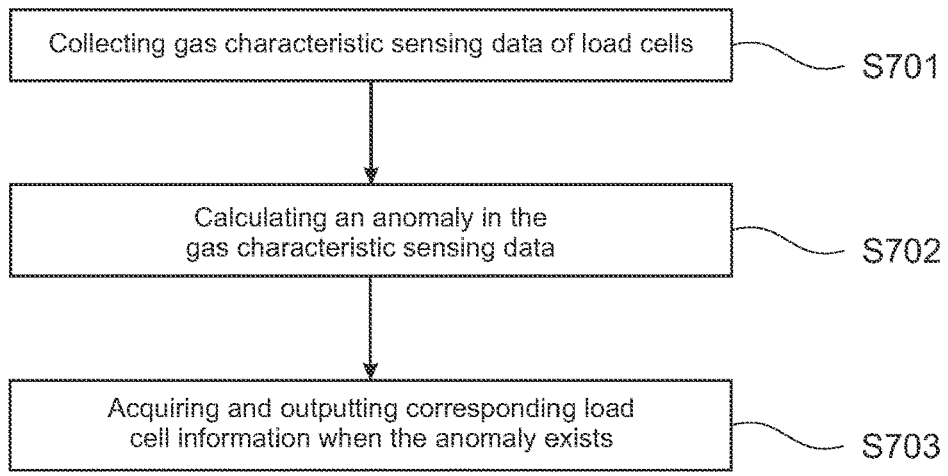
FIG. 7 is a schematic flowchart of a status detection method for a load cell according to a third embodiment of the present invention.

A method for detecting the status of a load cell in this embodiment is applied to a vehicle scale system and comprises, as seen in FIG. 7:

Step S701, collecting gas characteristic sensing data $G_{M_i}$ of the load cells.

The vehicle scale system of this embodiment first collects the gas characteristic sensing data $G_{M_i}$ of the load cells, and there is a gas characteristic sensing data queue ($G_{M_1}$, $G_{M_2}$, $G_{M_8}$).

Step S702, calculating an anomaly in the gas characteristic sensing data.

In this embodiment, the differences between the weight characteristic sensing data are detected by using an extreme value detection algorithm. To be specific, the gas characteristic sensing data queue ($G_{M_1}$, $G_{M_2}$, ..., $G_{M_8}$) is first sorted, and with the largest value and the smallest value removed, the mean of the other values is calculated. The differences between the largest and smallest values and the mean of the other values are calculated, and the differences are compared with a preset value. If the differences exceed the preset value, it is determined that the largest and smallest values are anomalous gas characteristic sensing data. The difference between the largest value or the smallest value and the mean of the other values in the characteristic sensing data except the anomaly is re-calculated, until there is no anomaly in the characteristic sensing data.

Step S703, acquiring and outputting corresponding load cell information when the anomaly exists.

The system determines the severity of anomaly depending on the degree by which the difference exceeds a deviation range, that is, the anomaly degree of an anomaly, so as to issue either a reminder or an alarm to the user. The difference between each piece of gas characteristic sensing data and the medium value $G_M$ is calculated by using the median algorithm, to obtain possible anomalous gas characteristic sensing data and its corresponding load cell in an anomalous state. Through comparison of the relationship between the difference, the deviation range, and an alarm preset value, it can be determined whether there is an anomaly with a significant difference in the gas, as well as the severity, which are fed back to the user in a timely manner.

Those skilled in the art can appreciate that the characteristic sensing data differentiation detection methods in Embodiments 1, 2, and 3 of the present invention are not limited to the detection methods listed in the embodiments, and detection methods in other embodiments can also be applied, all of which fall within the protection scope of the present invention. For example, in the zero-point weight data anomaly detection of Embodiment 2, the differences between the weight characteristic sensing data can also be detected by using the median method. To be specific, the weight characteristic sensing data $W_{M_i}$ of the load cells is first collected; then the characteristic sensing data is sorted, and with the medium value $W_M$ as a benchmark, the differences of the weight characteristic sensing data ($W_{M_1}$, $W_{M_2}$, $W_{M_3}$, $W_{M_4}$)–$W_M$ are calculated. If a difference exceeds a specified threshold, it is determined that there is anomalous weight characteristic sensing data, and then the anomaly severity of the anomalous weight characteristic sensing data is further determined.

Embodiment 4

Figure 8:
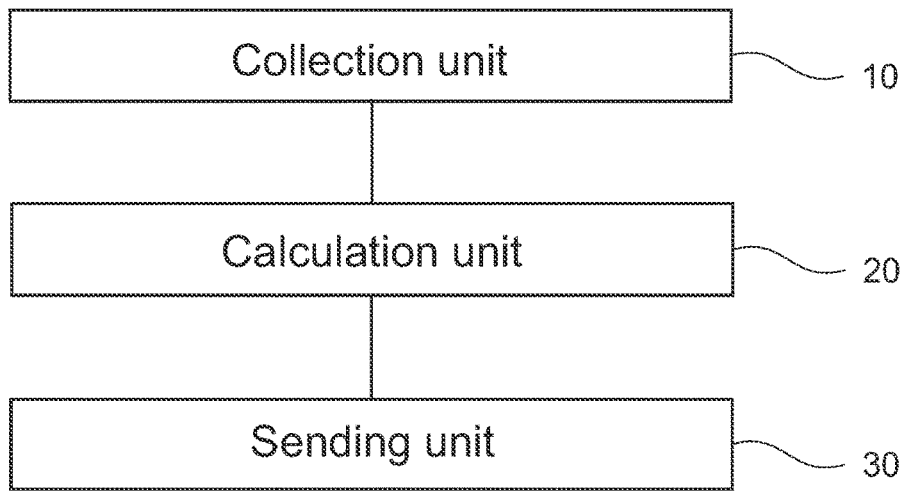
FIG. 8 is a schematic structural diagram of a status detection apparatus for a load cell according to a fourth embodiment of the present invention.

An embodiment of the present invention discloses an apparatus for detecting the status of a load cell. As shown in FIG. 8, the apparatus in this embodiment comprises: a collection unit 10 configured to collect characteristic sensing data of load cells; a calculation unit 20 configured to calculate an anomaly in the characteristic sensing data; and a sending unit 30 configured to acquire and output corresponding load cell information when the anomaly exists.

The apparatus for detecting the status of a load cell obtains the characteristic sensing data, such as one or more of weighing data, acceleration, temperature, humidity, angle, gas density, voltage, or current, from the load cells by using the collection unit. Further, the calculation unit is used to calculate which piece or pieces of characteristic sensing data in this type of characteristic sensing data is an anomaly, that is, particular values in a sample, data of which notably deviates from the remaining observations. In specific implementation, the calculation unit may calculate a possible anomaly therein by using the anomaly detection methods such as the median method, sigma distribution, standard score, Fast Fourier transform, and extreme value method that are described above.

After the calculation of the anomaly is completed, the information about the load cell, such as its number information or location information, corresponding to the anomaly is acquired and output by the sending unit to a display device such as a meter end or a user mobile end, so as to present, to the user on the meter end, a specific characteristic value of a specific load cell that has a problem. Text may be displayed on the meter, or a location indication of the anomalous load cell may be issued by turning on a light, so that the user can quickly find the load cell that has a problem. Through weight differentiation detection, anomalous weight data can be detected in real time, and users can be offered fault information and reminders in a timely manner, so as to avoid losses to customers due to inaccurate weighing. If an anomaly deviation of the anomaly is less than a preset alarm value, a reminder of an anomalous load cell state is issued.

Those skilled in the art can appreciate that the apparatus for detecting the status of a load cell in this embodiment is based on the same inventive concept as the methods for detecting the status of a load cell in Embodiment 1, Embodiment 2, and Embodiment 3. Therefore, for the corresponding content of this embodiment, reference may be made to the specific content of the foregoing embodiments, which will not be repeated herein.

It can be learned from the above description of the characteristic sensing data differentiation detection procedure that, those skilled in the art may clearly understand that the present invention may be implemented by means of software plus a necessary hardware platform. Based on such an understanding, the technical solutions of the present invention, in essence or the contribution to the prior art, may be embodied in the form of a software product, and the computer software product may be stored in a storage medium, including but not limited to a ROM/RAM (read-only memory/random access memory), a magnetic disk, an optical disc, etc., which includes several instructions that cause one or more computer devices (which may be a personal computer, a server, or a network device) to carry out the methods described in various embodiments or some parts in the embodiment of the present invention.

The characteristic sensing data differentiation detection procedure in the present invention may be described in a general context of a computer executable instruction executed by a computer, for example, a program module. Generally, the program module includes a program, an object, a component, a data structure, etc. for performing a specific task or implementing a specific abstract data type. The present invention may also be practiced in distributed computing environments where a task is performed by a remote processing device that is connected over a communication network. In the distributed computing environments, the program module may be located in local and remote computer storage media, including a storage device.

Moreover, the program module comprised in a parameter adjustment system of the present invention can be further subdivided, integrated, or redivided according to the needs of the deployment environment, hardware or software platform, etc. of the apparatus or program module, in addition to the division manner shown in the embodiments.

Although specific implementations of the present invention have been described above, those skilled in the art should understand that these are merely examples, and the scope of protection of the present invention is defined by the appended claims. Those skilled in the art may make various changes or modifications to these embodiments without departing from the principles and essence of the present invention, but all these changes and modifications fall within the scope of protection of the present invention.

What is claimed is:

1. A method for detecting the status of a load cell in a plurality of load cells in a material tank system, the method comprising the steps of:
    collecting, by way of a collection unit, characteristic sensing data of the load cells;
    calculating, by way of a calculation unit, an anomaly in the collected characteristic sensing data, including by at least:
        converting a time domain signal of each piece of the characteristic sensing data to a frequency domain through Fast-Fourier-Transformation calculation; and
        determining an anomaly through an amplitude-frequency characteristic comparison in frequency domain; and
    acquiring and outputting, by way of a sending unit, a corresponding load cell information when the anomaly exists.

2. The method of claim 1, wherein the characteristic sensing data comprise at least one of: weighing data, acceleration, temperature, humidity, angle, gas density, voltage, and current.

3. The method of claim 1, further comprising the steps of:
    issuing a reminder of an anomalous load cell state if the anomaly has a deviation that is less than a preset alarm value; and
    issuing an alarm reminder of load cell replacement if the anomaly deviation is greater than the preset alarm value.

4. The method of claim 1, wherein the step of calculating an anomaly comprises the steps of:
    calculating a difference between each piece of the characteristic sensing data and a statistical median; and
    determining that the corresponding characteristic sensing data is an anomaly, when the difference exceeds an anomaly deviation of an anomaly.

5. The method of claim 1, wherein the step of calculating an anomaly in the characteristic sensing data comprises the steps of:
    calculating whether each piece of the characteristic sensing data obeys a sigma distribution; and
    determining that the characteristic sensing data that does not fall within the sigma distribution is an anomaly.

6. The method of claim 1, wherein the step of calculating an anomaly in the characteristic sensing data comprises the steps of:
    calculating a standard score of each piece of characteristic sensing data; and
    determining that the characteristic sensing data having a deviation that exceeds an anomaly deviation of an anomaly is an anomaly.

7. The method of claim 1, wherein the step of calculating an anomaly in the characteristic sensing data comprises the steps of:
    calculating a mean of the characteristic sensing data, after excluding the largest value or the smallest value;
    calculating a difference between the largest value and the mean of the characteristic sensing data, or a difference between the smallest value and the mean of the characteristic sensing data;
    determining that the corresponding largest value or smallest value is an anomaly if the difference exceeds an anomaly deviation of an anomaly; and
    re-calculating the difference between the largest value or the smallest value and the mean in the characteristic sensing data except the anomaly, until there is no anomaly in the sensing characteristic data.

8. An apparatus for detecting the status of a load cell in a plurality of load cells in a material tank system, said apparatus comprising:
    a collection unit configured to collect characteristic sensing data of load cells;

a calculation unit configured to calculate an anomaly in the characteristic sensing data by at least:
  converting a time domain signal of each piece of the characteristic sensing data to a frequency domain through Fast-Fourier-Transformation calculation; and
  determining an anomaly through an amplitude-frequency characteristic comparison in frequency domain; and
a sending unit configured to acquire and output corresponding load cell information when the anomaly exists.

9. The apparatus of claim 8, wherein the characteristic sensing data comprises data from at least one of: weighing data, acceleration, temperature, humidity, angle, gas density, voltage, and current.

10. The apparatus of claim 8, wherein the calculation unit is configured to:
  calculate a difference between each piece of characteristic sensing data and a statistical median; and
  determine that the corresponding characteristic sensing data is an anomaly, when the difference exceeds an anomaly deviation of an anomaly.

11. The apparatus of claim 8, wherein the calculation unit is configured to:
  calculate whether each piece of the characteristic sensing data obeys a sigma distribution; and
  determine that the characteristic sensing data that does not fall within the sigma distribution is an anomaly.

12. The apparatus of claim 8, wherein the calculation unit is configured to:
  calculate a standard score of each piece of characteristic sensing data; and
  determine that the characteristic sensing data having a deviation that exceeds the deviation range is an anomaly.

13. The apparatus of claim 8, wherein the calculation unit is configured to:
  calculate a mean of the characteristic sensing data, after excluding the largest value or the smallest value;
  calculate a difference between the largest value and the mean of the characteristic sensing data, or a difference between the smallest value and the mean of the characteristic sensing data;
  determine that the corresponding largest value or smallest value is an anomaly if the difference exceeds an anomaly deviation of an anomaly; and
  re-calculate the difference between the largest value or the smallest value and the mean in the characteristic sensing data except the anomaly, until there is no anomaly in the characteristic sensing data.

\* \* \* \* \*